United States Patent
Kang

(10) Patent No.: US 6,836,653 B1
(45) Date of Patent: Dec. 28, 2004

(54) METHOD FOR APPLYING DIFFERENT CHARGE RATES AND FOR INDICATING LOCATION OF MOBILE STATION IN CELLULAR MOBILE TELECOMMUNICATION SYSTEM

(75) Inventor: Myung-Seok Kang, Songnam-shi (KR)

(73) Assignee: Samsung Electronics Co, LTD, Suwon-Si (KR)

( * ) Notice: Subject to any disclaimer, the term of this patent is extended or adjusted under 35 U.S.C. 154(b) by 0 days.

(21) Appl. No.: 09/533,643

(22) Filed: Mar. 22, 2000

(30) Foreign Application Priority Data

Mar. 22, 1999 (KR) .......................... 1999-9589

(51) Int. Cl.[7] .......................... H04M 11/00; H04Q 7/20
(52) U.S. Cl. .................. 455/408; 455/406; 455/407; 455/432.1; 455/433; 455/435.1; 455/435.2
(58) Field of Search ................. 455/406, 407, 455/408, 432, 433, 435, 414

(56) References Cited

U.S. PATENT DOCUMENTS

| | | | | |
|---|---|---|---|---|
| 5,953,652 A | * | 9/1999 | Amin et al. ................. | 455/410 |
| 5,974,323 A | | 10/1999 | Doner ......................... | 455/477 |
| 5,974,330 A | * | 10/1999 | Negishi ....................... | 455/457 |
| 6,035,198 A | | 3/2000 | Wiehe ......................... | 455/445 |
| 6,044,261 A | * | 3/2000 | Kazmi ......................... | 455/408 |
| 6,052,369 A | * | 4/2000 | Hamalainen et al. ........ | 370/389 |
| 6,205,326 B1 | * | 3/2001 | Tell et al. ................... | 455/406 |
| 6,311,072 B1 | * | 10/2001 | Barclay et al. .............. | 455/552 |
| 6,445,911 B1 | * | 9/2002 | Chow et al. ................. | 455/406 |

FOREIGN PATENT DOCUMENTS

| | | | |
|---|---|---|---|
| JP | 08-191355 | 7/1996 | .......... H04M/15/00 |
| JP | 10-243123 | 9/1998 | .......... H04M/15/00 |
| JP | 11-122644 | 4/1999 | ............ H04Q/3/58 |
| KR | 98-0015639 | 8/1998 | |
| WO | WO 93/25051 | 12/1993 | |
| WO | WO9842151 | 9/1998 | ............ H04Q/7/20 |
| WO | WO 98/42151 | 9/1998 | ............ H04Q/7/20 |
| WO | WO9912226 | 3/1999 | |

* cited by examiner

Primary Examiner—Vivian Chin
Assistant Examiner—Eugene Yun
(74) Attorney, Agent, or Firm—Cha & Reiter, L.L.C.

(57) ABSTRACT

Disclosed is a method for applying different charge rates and indicating the location of a mobile station in a cellular mobile telecommunication system. Location information for the major service zone of the mobile station is monitored in the home-zone list to apply different charge rate to the mobile station in the home zone and the non-home zone. By applying the different charge rates according to the location of the mobile station, it is possible to provide a low-priced charge system in which the charge rate is lower than that of the mobile telecommunication network or equal to or slightly higher than that of the PSTN. Moreover, the mobile station indicates its present location by a specific message or a specific tone, so that the subscriber knows both the present location and the type of the charge rate that is currently applied.

20 Claims, 8 Drawing Sheets

METHOD FOR APPLYING DIFFERENT CHARGE RATES AND FOR INDICATING LOCATION OF MOBILE STATION IN CELLULAR MOBILE TELECOMMUNICATION SYSTEM

CLAIM OF PRIORITY

This application claims priority to an application entitled "Method for Applying Different Charge Rates and Indicating Location of Mobile Station in Cellular Mobile Telecommunication System" filed in the Korean Industrial Property Office on Mar. 22, 1999 and assigned Serial No. 99-9589.

BACKGROUND OF THE INVENTION

1. Field of the Invention

The present invention relates generally to a cellular mobile telecommunication system, and in particular, to a method for setting a main service zone to apply different charge rates to a mobile station during a call connection, and a method for providing notice indicating the zone where the mobile station is presently located.

2. Description of the Related Art

A cellular mobile telecommunication system divides the whole service area into a plurality of base station areas in order to provide communication service. To increase the service capacity, each base station is further divided into a plurality of small service zones known as "cells." The base stations are controlled by a mobile switching center (MSC) on a centralization basis so that a mobile station can maintain a call while roaming from one cell to another.

FIG. 1 shows a network structure of a general cellular mobile telecommunication system. As illustrated, a base station (BS) 20 provides mobile telecommunication service to a subscriber through a mobile station (MS) 10. A base station controller (BSC) 30 is coupled to manage the base station 20. A mobile switching center (MSC) 40 is coupled to control the base station controller (BSC) 30 and connected to a public switched telephone network (PSTN) 50 or to another base station.

The mobile switching center (MSC) 40 is provided with information about the additional service and charging information of a mobile station in the visitor location register (VLR) 60 and the home location register (HLR) 70. For the mobile telecommunication service provider, the telephone charge is one of the most important factors considered in order to attract more subscribers. As the cost of the mobile service calls is generally higher than wired service calls, some mobile service providers began to provide a competitive rate, especially in local service, in an attempt to attract more mobile subscribers.

To this end, a new billing policy is being implemented by the existing mobile telecommunication provider to charge their customers at a lower rate or at a rate equal to or slightly higher than the PSTN service in a given service zone, so that mobile service providers can compete with their counterpart, the wired service provider. That is, in an area classified as the home zone, which refers to the main service zone of the mobile station, a lower charge is applied to the mobile station but a higher charge is applied to non-home zones.

SUMMARY OF THE INVENTION

It is, therefore, an object of the present invention to provide a method for generating a home-zone list of the mobile stations to apply different charge rates according to the service zone where the mobile station is located during a call.

It is another object of the present invention to provide a method for indicating the location of the service zone to the mobile station to inform whether the mobile station is located within the home-zone service.

According to one aspect of the present invention, there is provided a method for applying a different charge rate to a subscriber in a cellular mobile telecommunication system. The method comprising the steps of: generating, in a home location register (HLR), a home-zone list including location information for the home zone of a mobile station; sending the home-zone list in the home location register (HLR) to a visitor location register (VLR) coupled to a mobile switching center (MSC) which covers the service zone of the mobile station; storing the home zone list from the home location register (HLR) in the visitor location register (VLR); and, applying, by the mobile switching center, a different charge rate to a call performed in the home zone and a call performed in the non-home zone based on the home-zone list stored in the visitor location register (VLR).

According to another aspect of the present invention, there is provided a method for indicating the location of a mobile station in a cellular mobile telecommunication system. The method comprising the steps of: sending, by a mobile station, a location registration request to the visitor location register (VLR) of a mobile switching center (MSC) through a base station servicing the area where the mobile station is located via a base station controller (BSC); sending, by the visitor location register (VLR), the location registration request of the mobile station to a home location register (HLR); receiving, by the visitor location register (VLR), subscriber information included in the home-zone list from the home location register (HLR), wherein the home-zone list includes the location information of the home zone of the mobile station; storing the subscriber information of the mobile station in the visitor location register (VLR) and informing the mobile station of the acceptance of the location registration; determining whether the mobile station moves between the home zone and a non-home zone based on the home-zone list in the visitor location register (VLR); requesting, by the visitor location register (VLR), the mobile station to indicate its present location if the mobile station has moved between the home zone and the non-home zone; and, indicating, by the mobile station, the present location at the request of the visitor location register (VLR).

According to another aspect of the present invention, there is provided a method for indicating the location of a mobile station in a cellular mobile telecommunication system. The method comprising the steps of: sending, by a mobile station, a call origination request to a mobile switching center (MSC) through a base station serving the area where the mobile station is located via a base station controller (BSC); upon receipt of the call origination request, sending, by the mobile switching center, a home-zone list including the location information for the home zone to the base station controller (BSC), wherein the home-zone list indicates the main service zone of the mobile station; searching, by the base station controller (BSC), the home-zone list to determine whether the mobile station is located in the home zone or a non-home zone and requesting the mobile station to display the present location; and, displaying, by the mobile station, the present location at the request of the base station controller (BSC).

According to further aspect of the present invention, there is provided a method for indicating the location of a mobile station in a cellular mobile telecommunication system. The method comprising the steps of: receiving, by a mobile switching center, a request for call termination to a mobile station; upon receipt of the call termination request, paging, by the mobile switching center, the mobile station through a base station and a base station controller (BSC); receiving, by the mobile switching center, a paging response from the mobile station through the base station controller (BSC) and the base station; upon receipt of the paging response, sending, by the mobile switching center, a home-zone list of the mobile station to the base station controller (BSC), wherein the home-zone list includes location information for the home zone of mobile station; searching, by the base station controller (BSC), the home-zone list to determine whether the mobile station is located in the home zone or a non-home zone and requesting the mobile station to indicate the present location; and, indicating, by the mobile station, the present location at the request of the base station controller (BSC).

According to yet another aspect of the present invention, there is provided a method for indicating a location of a mobile station in a cellular mobile telecommunication system. The method comprising the steps of: sending, by a mobile station in service, its present location information to a base station controller (BSC) to which a traffic channel is presently connected; searching, by the base station controller (BSC), a home-zone list of the mobile station to determine whether the mobile station has moved between a home zone and a non-home zone, wherein the home-zone list includes the location information of the home zone for the mobile station; requesting, by the base station controller (BSC), the mobile station to display its present location if the mobile station has moved between the home zone and the non-home zone; and, displaying, by the mobile station, the present location at the request of the base station controller (BSC).

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. For the purpose of clarity, well-known functions or constructions are not described in detail as they would obscure the invention in unnecessary detail.

In the exemplary embodiment of the present invention, the location information of a "home zone", which is the main service zone of a specific mobile station, is managed in a home-zone list so that a different charge rate can be determined for a call performed in the home zone and a non-home zone. The home zone is defined as an area of the subscriber's residential or its surrounding area. Depending on the criteria set by the service provider, the boundary of the home zone is defined accordingly. For example, if the service provider sets the boundary of the subscriber's residence as the home zone as an incentive for the mobile subscriber to use the mobile service at his or her residence, the subscriber is billed at a lower rate for any calls made within the home zone. To this end, if the subscriber of a mobile station subscribes to a home-zone service, a mobile communication service provider finds an address of the subscriber and stores the location information of the cell adjacent to the mobile location which falls within the home zone in the home-zone list.

According to the present invention, a mobile telecommunication system applies different charge rates to the subscriber based on the coverage zone of the cells that are under the control of a mobile switching center (MSC) 40 using the visitor location register (VLR) 60 and the home location register (HLR) 70 coupled thereto. The location information stored in the home-zone list may include an ID (Identification) of a mobile switching center (MSC) covering the service zone including the home zone of the mobile station, an ID of a base station controller (BSC) servicing the corresponding service zone, and an ID of the base station servicing the corresponding service zone.

However, if the base station uses a plurality of sector antennas to divide one cell into a plurality of sectors for more capacity, the location information also includes an ID of the sector servicing the corresponding service zone. In this case, the location information stored in the home-zone list includes an ID of the mobile switching center, an ID of the base station controller (BSC), an ID of the base station, and an ID of the sector.

Figure 1:
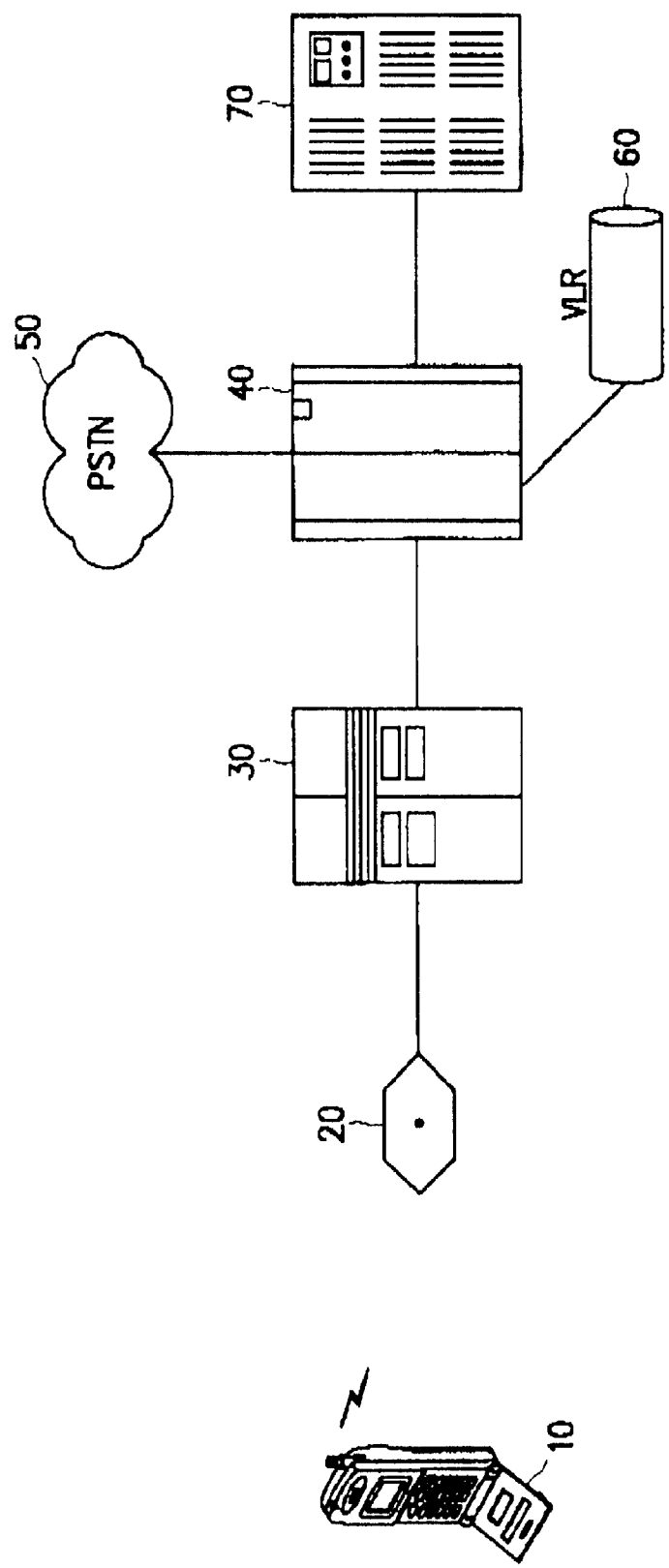
FIG. 1 is a diagram illustrating the network structure of a general cellular telecommunication system.
Figure 2:
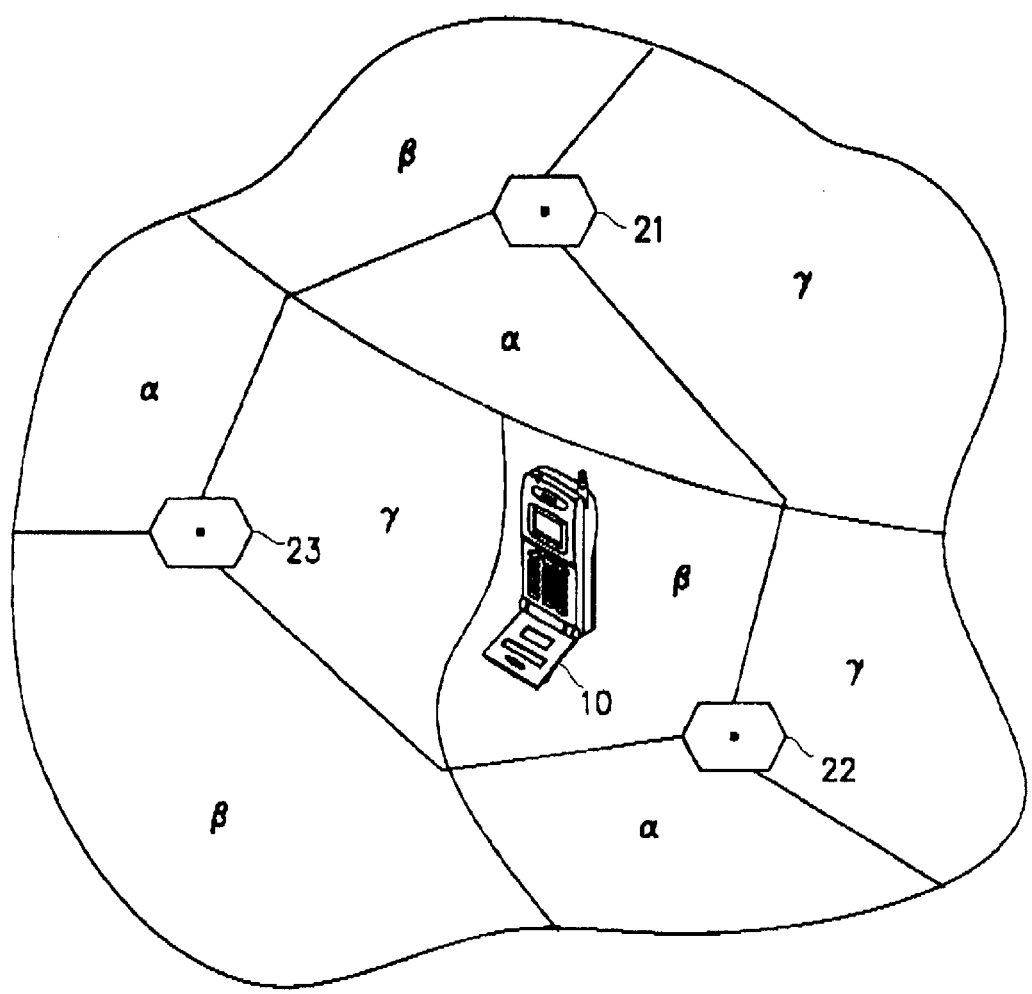
FIG. 2 is a diagram illustrating the home-zone list of a mobile station according to an embodiment of the present invention.

FIG. 2 depicts the home-zone list of a mobile station according to the embodiment of the present invention. As illustrated, the first to third base stations 21, 22 and 23 are adjacent to the home service zone of a mobile station 10. As each service zone of the base stations 21, 22 and 23 is divided into α, β and γ sectors, the home-zone list of the mobile station 10 stores the α sector ID of the first base station 21, the β sector ID of the second base station 22, the γ sector ID of the third base station 23, the ID of the base station controller (BSC) for controlling the base stations, and the ID of the mobile switching center (MSC) for controlling the base station controller (BSC).

The home-zone list is stored in the home location register (HLR), and the home-zone is defined by the adjacent sector (or cell) where the mobile station is located. With regard to the structure of the home-zone list, there may exist several sectors (or cells) when the mobile station is located at the edge of a specific cell. Alternatively, if the subscriber is located at the center of a sector, there may exist only one sector (or cell). However, it should be noted that a different combination of the sectors or cells can be assigned as the home zone by the service provider. After the subscriber information (i.e., home-zone list information) is stored in the home location register (HLR), if a location registration required due to the movement of the mobile station or if the mobile station receives a call origination request or receives a call termination request, the home location register (HLR) sends the home-zone list of the mobile station to the visitor location register (VLR) of the mobile switching center (MSC) connected to the base station covering the mobile station.

As explained in the above scenarios, the mobile switching center (MSC) stores the home-zone list of the mobile station in the visitor location register (VLR). The visitor location register (VLR) determines whether the location information of the mobile station is included in the home-zone list, to detect whether the mobile station has moved from the home zone to the non-home zone or from the non-home zone to the home zone. Accordingly, if a mobile station sends a call origination request or receives a call termination request, the subscriber can be informed whether the mobile station is presently located in the home zone or non-home zone based on the determination made by the visitor location register (VLR). Then, the mobile subscriber can be informed of the present location through characters displayed on the display unit of a mobile station or by a specific tone generated from the mobile station. To this end, the visitor location register (VLR) provides the home-zone list to the base station controller (BSC). The base station controller (BSC) requests the mobile station to indicate the present location during a call termination or origination of the mobile station, or during a call by displaying the appropriate characters or tone. Moreover, the base station controller (BSC) stores the cell movement history and sends the cell movement history to the mobile switching center (MSC) when the call is released, thereby enabling the mobile switching center (MSC) to apply different charge rates to the mobile station.

Figure 3:
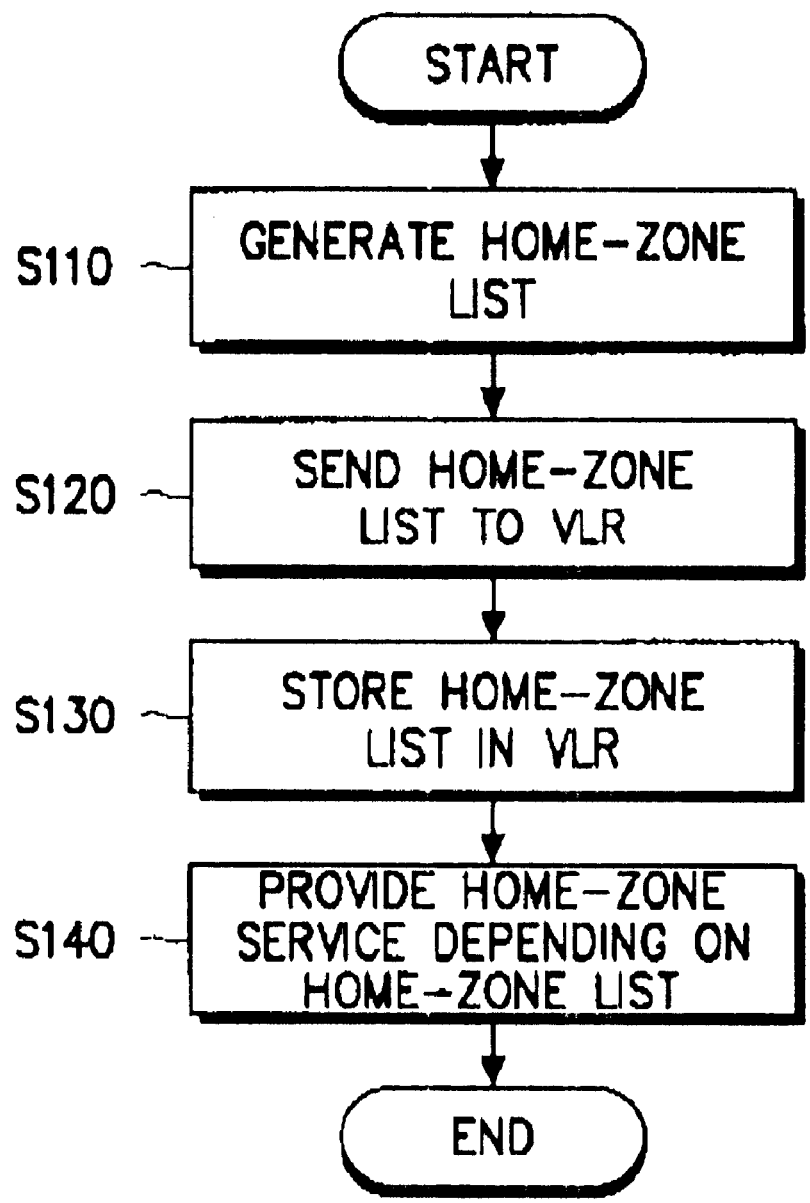
FIG. 3 is a flow chart illustrating a method for applying different charge rates according to the embodiment of the present invention.

FIG. 3 shows a method for applying different charge rates according to the embodiment of the present invention. As illustrated, a home location register (HLR) generates a home-zone list including the location information of a mobile station in step s110. The home location register (HLR) sends the subscriber information including the home-zone list to the a visitor location register (VLR) of the mobile switching center (MSC) connected to the mobile station in step s140. The visitor location register (VLR) stores the subscriber information including the home-zone list in step s130. The mobile switching center (MSC) applies the first charge format (or rate) to a call performed in the home zone and the second charge format to a call performed in the non-home zone, based on the home-zone list stored in the visitor location register (VLR), in step s140.

More specifically, if a specific mobile station requests the location registration, the home location register (HLR) generates a home-zone list for the mobile station using the location information of the main service zone, in step s110. The home-zone list is stored in the home location register (HLR) together with the subscriber information of other mobile stations. If the mobile station requests a call origination or a termination call, the mobile switching center (MSC) searches the visitor location register (VLR) for the subscriber information of the mobile station. If there is no subscriber information of the mobile station in the visitor location register (VLR), the visitor location register (VLR) requests the home location register (HLR) to provide the subscriber information of the mobile station. Then, the home location register (HLR) provides the subscriber information including the home-zone list of the mobile station to the visitor location register (VLR), in step s120. The visitor location register (VLR) then stores the home-zone list in step s130. Moreover, if there is no call origination or call termination, the home location register (HLR) provides the home-zone list to the visitor location register (VLR) of the mobile switching center (MSC) whenever the home-zone list is updated. The visitor location register (VLR) then stores the home-zone list received from the home location register (HLR).

When the visitor location register (VLR) stores the home-zone list, the mobile switching center (MSC) applies the charge rate to the mobile station differently for the home zone and the non-home zone. The mobile station calculates the call time duration in the home zone and the call time duration in the non-home zone, then provides the calculated call time duration to the base station controller (BSC), which manages the movement of the mobile station, if the mobile station releases the call. To this end, the visitor location register (VLR) provides the home-zone list to the base station controller (BSC) connected to the mobile station so that the base station controller (BSC) can detect the location of the mobile station. The base station controller (BSC) examines whether the mobile station presently in service moves from the home zone to the non-home zone or moves from the non-home zone to the home zone, then calculates the total call time in the home zone and the total call time in the non-home zone.

Figure 4:
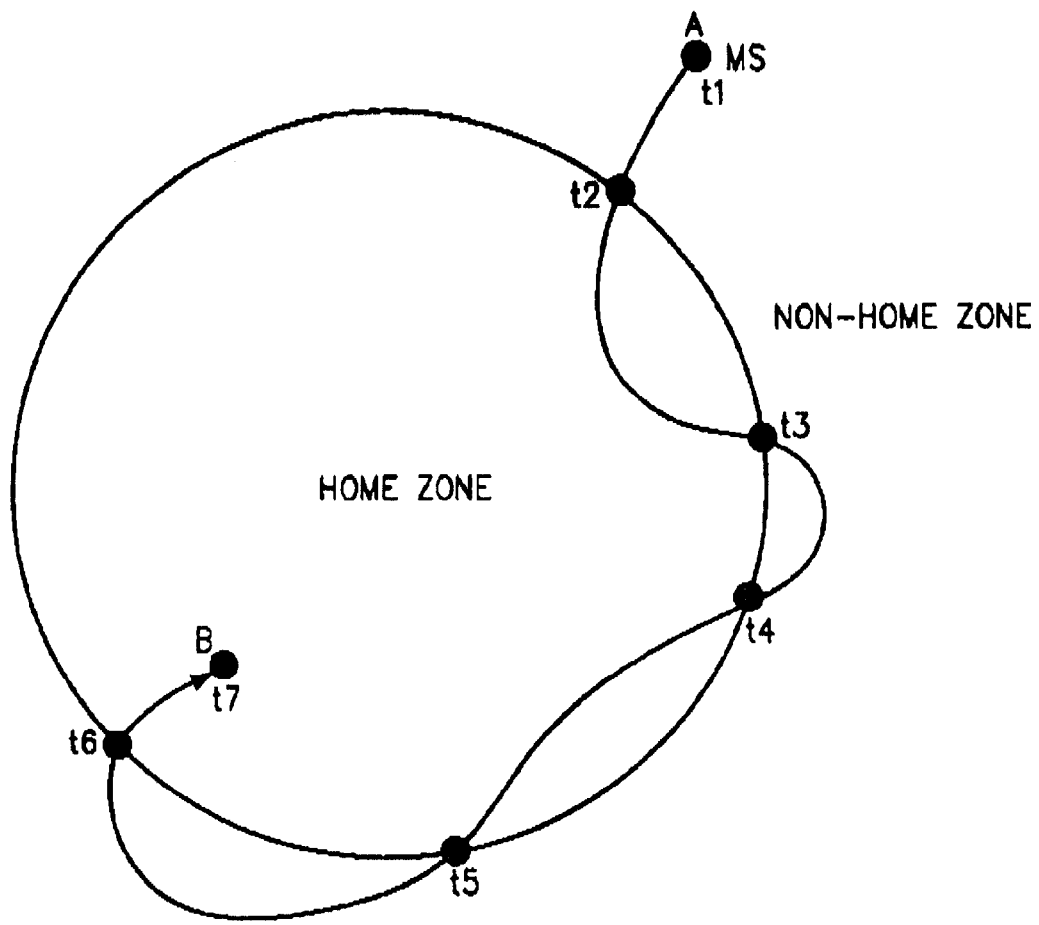
FIG. 4 is a diagram illustrating the movement of a mobile station as an illustrative example.

FIG. 4 shows the movement of the mobile station, as a way of example. As illustrated, if the mobile station which started a call in location A moves along the boundary of the home zone and ends the call in location B, the base station controller (BSC) connected to the mobile station calculates the total call time of the mobile station in the home zone and the non-home zone, then provides the respective calculated call time to the mobile switching center. In FIG. 4, the total call time in the home zone is (t3–t2)+(t5–t4)+(t7–t6), and the total call time in the non-home zone is (t2–t1)+(s4–t3)+(t6–t5). The mobile switching center (MSC) then applies the first charge to the call time (t3–t2)+(t5–t4)+(t7–t6) for the home zone and the second charge to the call time (t2–t1)+(s4–t3)+(t6–t5) for the non-home zone. For example, the mobile switching center (MSC) generates a lower charge rate to the call performed in the home zone than the call performed in the non-home zone.

The base station controller (BSC) transmits the call duration information of the mobile station to the mobile switching center (MSC) when the mobile station ends the call. Alternatively, the base station controller (BSC) can transmit the call time information of the mobile station in each zone to the mobile switching center (MSC) whenever the mobile station in service moves between the home zone and the non-home zone. For example, the base station controller (BSC) provides the mobile switching center (MSC) with the call time (t2–t1) in the non-home zone at time t2 and the call time (t3–t2) in the home zone at time t3. Through this process, it is possible to apply different charge rates to the mobile station in the home zone and the non-home zone. In this case, the subscriber of the mobile station may desire to know which charge rate is applicable at the current location.

Therefore, when the mobile station is registered in the home-zone service, the mobile switching center (MSC) monitors the present location to the mobile station to let the subscriber of the mobile station know which charge rate is applied to him during the call. For example, the mobile station can indicate through a string of characters whether the present location belongs to the home zone or the non-home zone or using a specific tone to indicate whether the mobile station has moved from the home zone to the non-home zone or from the non-home zone to the home zone.

Accordingly, there are different types of events when the mobile station will notify its present location: (1) if the mobile station performs the location registration for its movement; (2) if the mobile station requests the call origination; (3) if the mobile station receives the call termination request; or (4) if the mobile station moves from the home zone to the non-home zone and vice versa, during a call connection. A detailed description will be made below regarding the location indication method.

Figure 5:
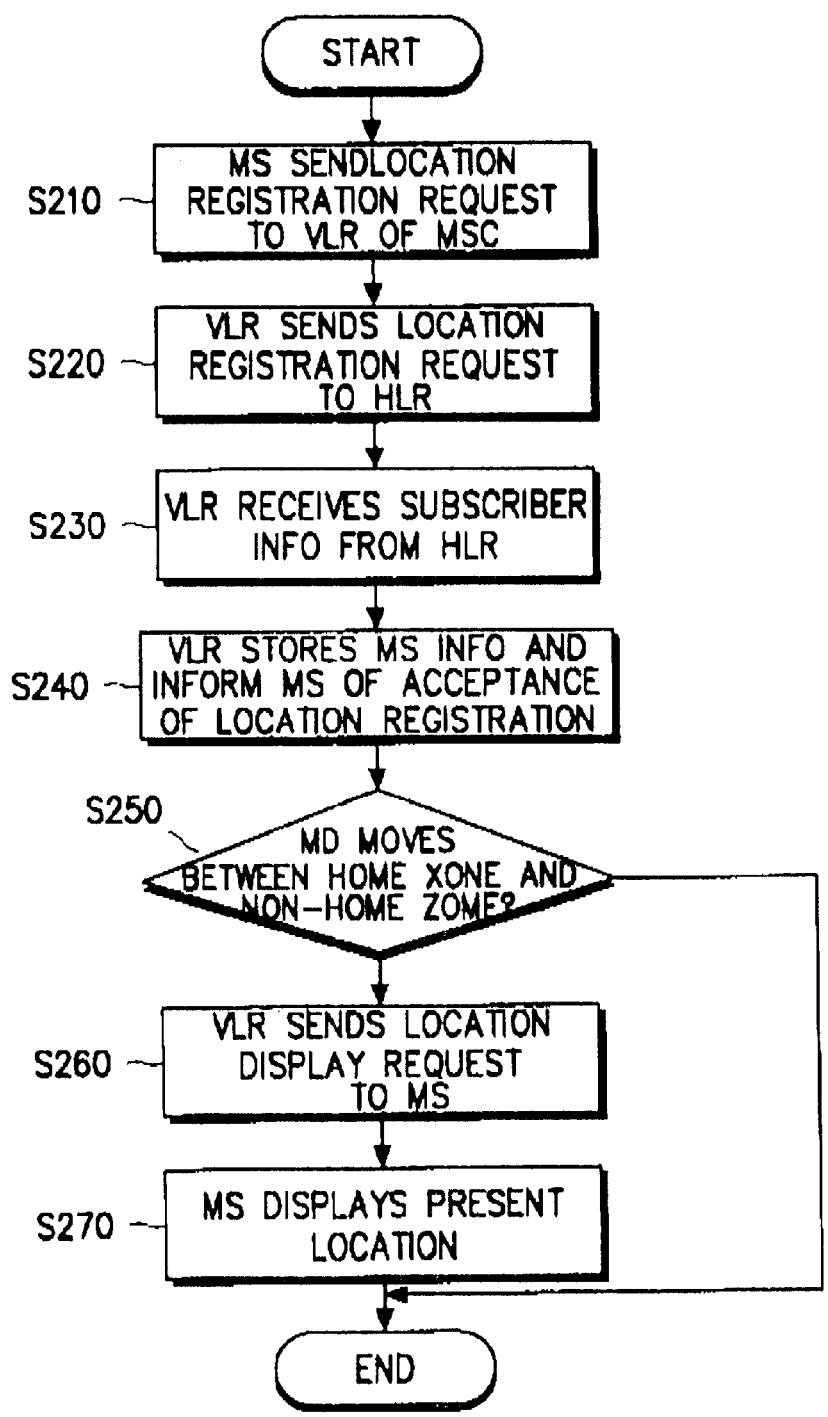
FIG. 5 is a flow chart illustrating a method for indicating the location of a mobile station during location registration according to the embodiment of the present invention.

FIG. 5 shows a method for indicating the location of the mobile station during location registration according to the embodiment of the present invention. As illustrated, the mobile station sends a location registration request to the visitor location register (VLR) (VLR) of the mobile switching center (MSC) through the base station and the base station controller (BSC) in step s210. The visitor location register (VLR) sends a location registration request for the mobile station to the home location register (HLR) in step s220. After the request of the location registration, the visitor location register (VLR) receives the subscriber information including the home-zone list of the mobile station from the home location register (HLR) in step s230. Upon receipt of the location registration information, the visitor location register (VLR) stores the subscriber information of the mobile station and informs the mobile station of the acceptance of the location registration, in step s240. After reporting the acceptance of the location registration, the visitor location register (VLR) determines whether the mobile station has moved between the home zone and the non-home zone based on the home-zone list, in step s250. If the mobile station has moved between the home zone and the non-home zone, the visitor location register (VLR) sends the mobile station a request message for indicating the present location, in step s260. The mobile station indicates the present location in response to the request message from the visitor location register (VLR), in step s270.

More specifically, in step s210, the mobile station registered in the cellular mobile telecommunication system registers the location of the mobile station periodically or non-periodically. For location registration, if the mobile station sends a location registration message to the base station controller (BSC) through the base station, the base station controller (BSC) sends the location updating request message including the ID of a base station to the mobile switching center (MSC) and the corresponding sector ID. The mobile switching center (MSC) then detects the location of the mobile station, which has requested the location registration, by analyzing the location updating request message, then informs the visitor location register (VLR) that the mobile station has requested the location registration. In step s220, the visitor location register (VLR) transmits a location registration notification message including the ID of the base station to which the mobile station belongs and the corresponding sector ID to the home location register (HLR), thereby requesting the location registration of the mobile station. The home location register (HLR) updates the subscriber information of the mobile station at the request of the visitor location register (VLR) and transmits the location registration notification message including the updated subscriber information to the visitor location register (VLR), thereby notifying the acceptance of the location registration. If the mobile station subscribes to the home-zone service, the subscriber information includes the hone-zone list information of the mobile station.

Upon receipt of the subscriber information including the home-zone list from the home location register (HLR) in step s230, the visitor location register (VLR) stores the home-zone list and the subscriber information of the mobile station received from the home location register (HLR), then informs the mobile station of the acceptance of the location registration, in step s240. After performing the location registration of the mobile station, the visitor location register (VLR) examines the home-zone list included in the subscriber information, in step s250, to determine whether the present location information of the mobile station is included in the home-zone list. The visitor location register (VLR) (VLR) can detect the present location of the mobile station based on the base station ID and the sector ID transmitted from the base station controller (BSC). At this point, the visitor location register (VLR) compares the previously stored location information of the mobile station with the present location information of the mobile station, to determine whether the mobile station has moved between the home zone and the non-home zone. That is, if the present location information of the mobile station is included in the home-zone list, the visitor location register (VLR) sets the home-zone flag of the mobile station to "1" (or True). Otherwise, if the present location information of the mobile station is not included in the home-zone list, the visitor location register (VLR) sets the home-zone flag of the mobile station to "0" (or False).

Accordingly, if the present location information of the mobile station is detected in the home-zone list, the visitor location register (VLR) sets the home-zone flag to "1" indicating the home zone, otherwise sets the home-zone flag to "0" indicating the non-home zone. Therefore, the visitor location register (VLR) can determine whether the mobile station has moved between the home zone and the non-home zone by examining whether the home-zone flag value of the mobile station changes.

If the mobile station has moved from the home zone to the non-home zone or from the non-home zone to the home zone, the visitor location register (VLR) requests the mobile station to newly indicate the present location through the base station and the base station controller (BSC), in step s260. Then, in step s270, the mobile station informs the subscriber through a string of characters whether the present location belongs to the home zone or the non-home zone. In this manner, the mobile station displays the zone of the present location on the display unit of the mobile station whenever the mobile station moves between the home zone and the non-home zone. For example, if the mobile station has moved from the home zone to the non-home zone, the mobile station displays "NON-HOME ZONE" on the display unit at the request of the visitor location register (VLR). Otherwise, if the mobile station has moved from the non-home zone to the home zone, the mobile station displays "HOME ZONE" on the display unit at the request of the visitor location register (VLR).

However, if the mobile station has not moved between the home zone and the non-home zone, the visitor location register (VLR) does not request the mobile to display the zone of the present location, and the mobile station maintains the characters previously displayed. In this manner, the mobile station can display whether the present location belongs to the home zone or non-home zone whenever a location registration is performed. Therefore, the subscriber can know whether the mobile station is presently located in the home zone or non-home zone through the information displayed on the display unit of the mobile station.

Figure 6:
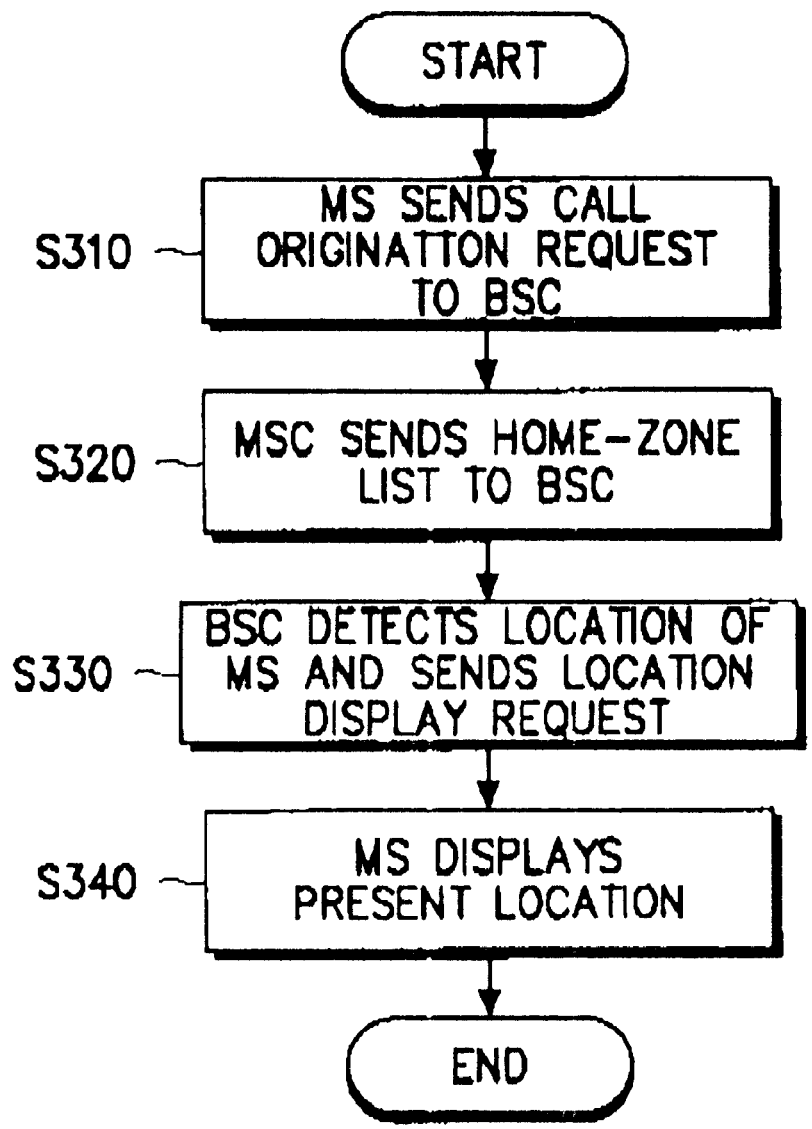
FIG. 6 is a flow chart illustrating a method for indicating the location of the mobile station during call origination according to the embodiment of the present invention.

FIG. 6 shows a method for indicating the location of the base station during call origination according to the embodiment of the present invention. As illustrated, the mobile station sends a call origination request to the mobile switching center (MSC) through the base station and the base station controller (BSC), in step s310. Upon receipt of the call origination request, the mobile switching center (MSC) sends the home-zone list of the mobile station to the base station controller (BSC), in step s320. The base station controller (BSC) searches the home-zone list to determine whether the mobile station is located in the home zone or the non-home zone and requests the mobile station to indicate the present location, in step s330. The mobile station displays the zone of the present location at the request of the base station controller (BSC), in step s340.

More specifically, in step s310, if the subscriber dials the phone number of another party, the mobile station sends a call origination request message including the called (or dialed) phone number to the base station controller (BSC) through the base station. The base station controller (BSC) then sends a CM service request message including the unique number of the mobile station, the base station ID, the base station controller (BSC) ID, and the called phone number to the mobile switching center (MSC), thereby requesting the call origination.

Upon receipt of the call origination request, if the mobile switching center (MSC) transmits a SCCP (Signaling Connection Control Part) connection confirmed message to the base station controller (BSC), the base station controller (BSC) transmits a setup message to the mobile switching center (MSC) and the mobile switching center (MSC) transmits a call processing message to the base station controller (BSC). After connecting a channel for call origination, the mobile switching center (MSC) analyzes the origination number and the termination number of the mobile station and then requests the visitor location register (VLR) to provide the subscriber information of the mobile station, i.e., the home-zone list. The visitor location register (VLR) searches the subscriber information of the mobile station and then transmits the searched subscriber information to the mobile switching center. If the mobile station subscribes to the home-zone service, the subscriber information includes the home-zone list of the mobile station. Otherwise, if the mobile station does not subscribe to the home-zone service, the subscriber information does not include the home-zone list of the mobile station. A description of the invention will be limited to the operation of the mobile station subscribing to the home-zone service.

In step s320, the mobile switching center (MSC) sends the home-zone list received from the visitor location register (VLR) to the base station controller (BSC) using an assignment request message. In step s330, the base station controller (BSC) examines whether the present location information of the mobile station is included in the home-zone list, thereby determining the present location of the mobile station. When the present location information of the mobile station is included in the home-zone list, it means that the mobile station is presently located in the home zone. Otherwise, if the present location information of the mobile station is not included in the home-zone list, it means that the mobile station is presently located in the non-home zone.

After determining the present location of the mobile station, the base station controller (BSC) transmits a feature notification message to the mobile station through the base station, to request the display of the present location. Here, the feature notification message includes the present location information (home-zone or non-home zone information) of the mobile station determined by the base station controller (BSC). Then, in step s340, the mobile station displays the zone of the present location indicated by the feature notification message through a string of characters.

In this process, a subscriber who desires to originate a call can know whether the present location belongs to the home zone or the non-home zone through the characters displayed on the display unit of the mobile station.

Figure 7:
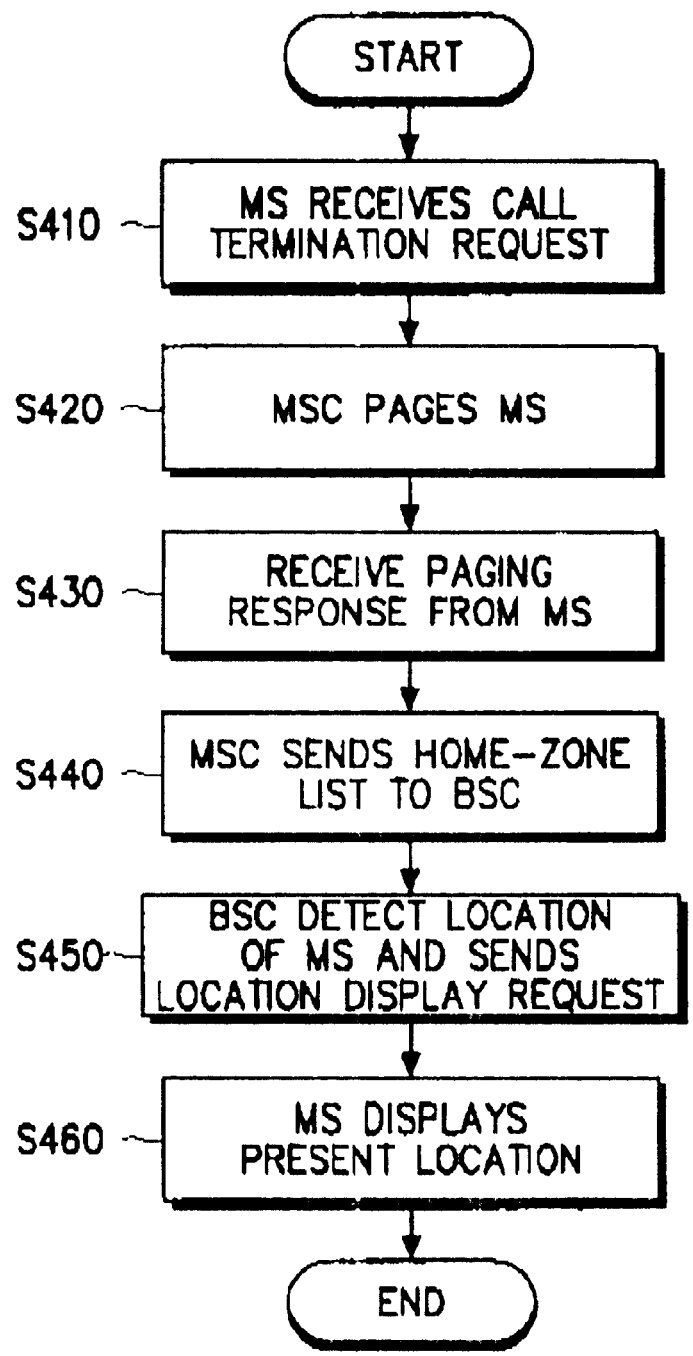
FIG. 7 is a flow chart illustrating a method for indicating the location of the mobile station during call termination according to the embodiment of the present invention; and, FIG. 8 is a flow chart illustrating a method for indicating the location of the mobile station during a call according to the embodiment of the present invention.

FIG. 7 shows a method for indicating the location of the mobile station during call termination according to the embodiment of the present invention. As illustrated, the mobile station receives a call termination request, in step s410. Upon receipt of the call termination request, the mobile switching center (MSC) pages the mobile station through the base station and the base station controller (BSC), in step s420. The mobile switching center (MSC) receives a paging response from the mobile station through the base station and the base station controller (BSC), in step s430. Upon receipt of the paging response, the mobile switching center (MSC) sends a home-zone list of the mobile station to the base station controller (BSC), in step s440. The base station controller (BSC) searches the home-zone list to determine whether the mobile station is located in the home zone or the non-home zone and requests the mobile station to display the zone of the present location, in step s450. The mobile station displays the zone of the present location at the request of the base station controller (BSC) in step s460.

A detailed description of the embodiment will be made with reference to a case where the mobile switching center (MSC) receives a request for call termination. As shown in FIG. 7, in step s410, a second mobile switching center (MSC) receives a request directed to a second mobile station for call termination from a first mobile station in the service zone of a first mobile switching center (MSC). Upon receipt of the call termination request, the second mobile switching center (MSC) requests its visitor location register (VLR) to provide the subscriber information of the second mobile station. If the second mobile station subscribes to the home-zone service, the subscriber information of the second mobile station will include the home-zone list of the second mobile station. Here, the description of the embodiment will be limited to the operation of the second mobile station subscribing to the home-zone service. That is, if the second mobile station subscribes to the home-zone service, the visitor location register (VLR) transmits the subscriber information including the home-zone list of the second mobile station, to the second mobile switching center.

When the first mobile switching center (MSC) sends a request for paging the mobile station to the base station controller (BSC) servicing the zone where the second mobile station is located, the base station controller (BSC) pages the second mobile station through the base station servicing the zone where the second mobile station is located, in step s420. In step s430, the second mobile station sends a paging response to the first mobile station through the base station, the base station controller (BSC) and the second mobile switching center. In step s440, if the first mobile switching center (MSC) sends a terminated-call processing order to the second mobile switching center, the second mobile switching center (MSC) sends the home-zone list of the second mobile station to the base station controller (BSC). In step s450, the base station controller (BSC) monitors the movement of the second mobile station by searching the home-zone list. In step s460, the second mobile station displays the zone of the present location on the display unit of the mobile station at the request of the base station controller (BSC). That is, the base station controller (BSC) determines whether the present location information of the second mobile station is included in the home-zone list. If the present location information of the second mobile station is included in the home-zone list, the base station controller (BSC) requests the second mobile station to display a string of characters, "HOME ZONE", and the second mobile station then displays, "HOME ZONE", on the display unit of the mobile station at the request of the base station controller (BSC). Otherwise, if the present location information of the second mobile station is not included in the home-zone list, the base station controller (BSC) requests the second mobile station to display, "NON-HOME ZONE", and the second mobile station then displays, "NON-HOME ZONE", on the display at the request of the base station controller (BSC).

Although the invention has been described with reference to the embodiment where the mobile switching center (MSC) receives a request for call termination from a mobile station in one service zone belonging to one mobile switching center (MSC) to another mobile station in another service zone belonging to another mobile switching center (MSC), the invention can also be applied to other scenarios where the mobile switching center (MSC) receives a request for call termination from one mobile station to another mobile station in the same service zone. That is, if the mobile switching center (MSC) receives a request for call termination in the same service zone, the mobile switching center (MSC) generates a call originator which is a software block for processing a call from an originating mobile station and a call terminator which is a software block for processing a call to a terminating mobile station. When the call originator requests the visitor location register (VLR) to provide the subscriber information of the terminating mobile station, the visitor location register (VLR) transmits the subscriber information including the home-zone list of the terminating mobile station to the call originator.

In step s420, upon receipt of the home-zone list, the call originator sends a paging request message to the call terminator of the mobile switching center. The call terminator then sends a paging request to the base station controller (BSC) servicing a zone where the terminating mobile station is located, and the base station controller (BSC) sends a paging message to the terminating mobile station through the base station servicing the zone where the terminating mobile station is located.

In step 430, upon receipt of the paging message, the terminating mobile station sends a paging response message to the base station controller (BSC) through the base station and the base station controller (BSC) transmits the paging response message to the call terminator. Upon receipt of the paging response message from the mobile station through the base station and the base station controller (BSC), the call terminator of the mobile switching center (MSC) transmits the paging response message to the call originator.

Upon receipt of the paging response message, the call originator transmits the subscriber information of the terminating mobile station to the call terminator for processing a terminating call. At this point, the subscriber information transmitted to the call terminator includes the home-zone list of the terminating mobile station. Then, in step s440, the call terminator of the mobile switching center (MSC) transmits the home-zone list to the base station controller (BSC) through an assignment request message.

In step s450, the base station controller (BSC) determines whether the present location information of the terminating mobile station is included in the home-zone list, to determine the present location of the mobile station. If the present location information of the mobile station is included in the home-zone list, it means that the mobile station is presently located in the home zone. Otherwise, if the present location information of the mobile station is not included in the home-zone list, it means that the mobile station is presently located in the non-home zone.

After determining the present location of the mobile station, the base station controller (BSC) transmits a feature notification message to the mobile station through the base station to request the mobile station to display the zone of the present location. Here, the feature notification message includes the present location information (home zone or non-home zone) of the mobile station determined by the base station controller (BSC). In step s460, the mobile station displays the zone of the present location indicated by the feature notification message on the display unit in the form of character message.

Through this process, the mobile station can display the zone of the present location whenever it receives a call termination request. Therefore, the subscriber can know whether the mobile station is presently located in the home zone or the non-home zone using the information being displayed on the display of the mobile station.

Figure 8:
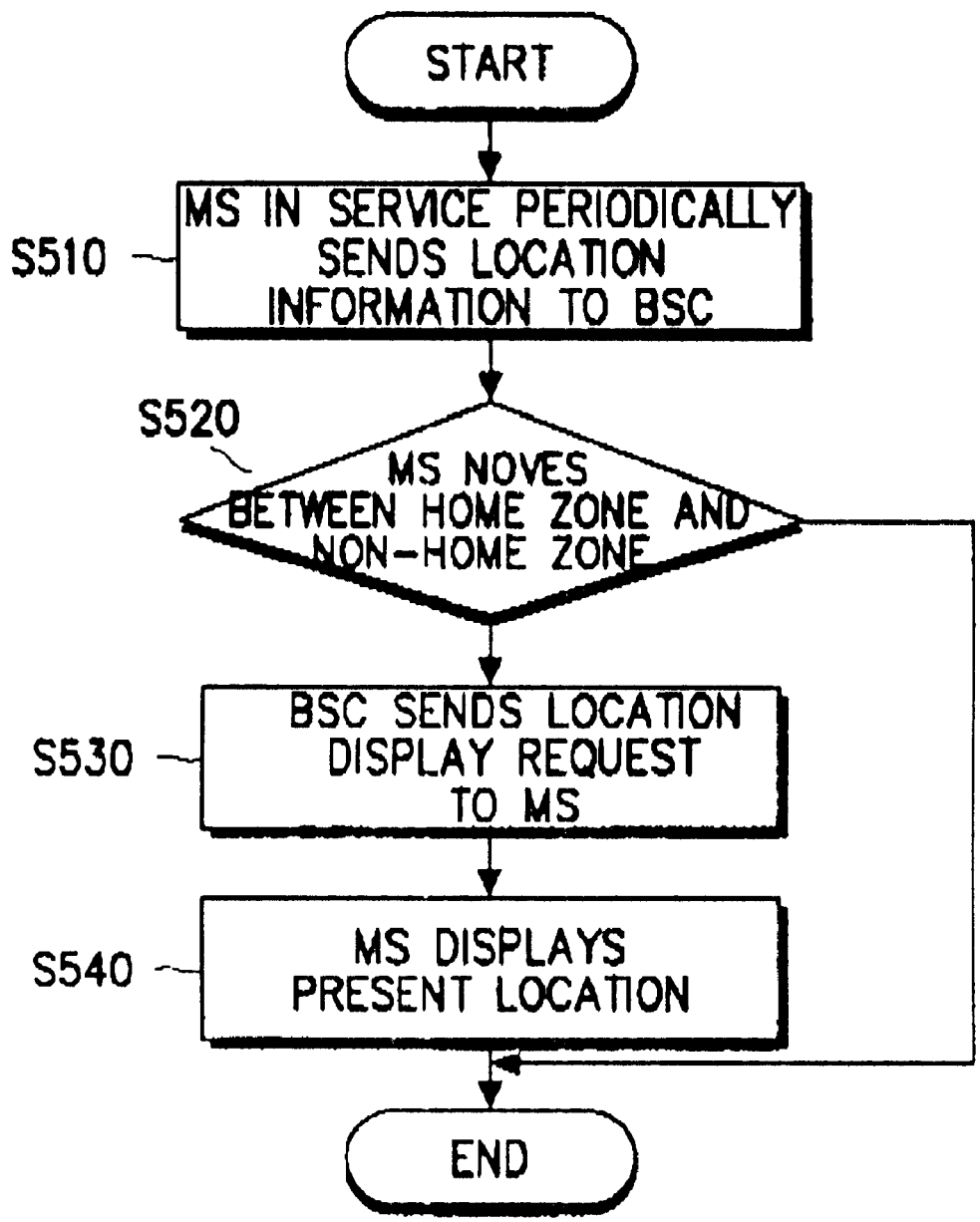

FIG. 8 shows a method for indicating the location of the mobile station during a call according to the embodiment of the present invention. As illustrated, during a call, a mobile station periodically transmits its present location information to the base station controller (BSC) connecting the traffic channel, in step s510. The base station controller (BSC) searches the home-zone list of the mobile station to determine whether the mobile station has moved between the home zone and the non-home zone, in step s520. When the mobile station has moved between the home zone and the non-home zone, the base station controller (BSC) requests the mobile station to display the zone of the present location, in step s530. The mobile station displays the zone of the present location at the request of the base station controller (BSC), in step s540.

More specifically, if the mobile station establishes a call with the other party, the mobile station subscribing to the home-zone service periodically or non-periodically transmits its present location information to the base station controller (BSC) through the base station during the call. Here, the mobile station transmits the present location information to the base station controller (BSC) whenever a handoff occurs or a predetermined period expires. The base station controller (BSC) connected to the mobile station subscribing to the home-zone service receives the home-zone list of the mobile station from the mobile switching center (MSC) during the call setup process and stores the received home-zone list.

The base station controller (BSC) determines in step s520 whether the present location information of the terminating mobile station is included in the home-zone list and compares the present location information with the previously stored location information of the terminating mobile station to determine whether the mobile station has moved between the home zone and the non-home zone. If the present location information of the terminating mobile station is included in the home-zone list, it means that the terminating mobile station is currently located in the home zone. Otherwise, if the present location information of the terminating mobile station is not included in the home-zone list, it means that the terminating mobile station is currently located in the non-home zone.

When the present location information of the mobile station is included in the home-zone list, the base station controller (BSC) sets the home-zone flag of the mobile station to "1". Otherwise, if the present location information of the mobile station is not included in the home-zone list, the base station controller (BSC) sets the home-zone flag of the mobile station to "0". That is, after searching the home-zone list for the present location information of the mobile station, the base station controller (BSC) sets the home-zone flag according to the search results. Therefore, the base station controller (BSC) can determine whether the mobile station has moved between the home zone and the non-home zone by examining whether the home-zone flag of the mobile station is changed.

When the mobile station has moved between the home zone and the non-home zone, the base station controller (BSC) sends the feature notification message to the mobile station through the base station to request the mobile station to display the zone of the present location, in step s530. Then, in step s540, the mobile station indicates through a specific tone that the mobile station has moved between the home zone and the non-home zone. A subscriber may be much interested in knowing whether the mobile station has moved from the home zone charging a lower rate to the non-home zone charging at a higher rate. Accordingly, the base station controller (BSC) controls the mobile station to indicate the present location only when the mobile station has moved from the home zone to the non-home zone. That is, the base station controller (BSC) sends the feature notification message only when the home-zone flag is changed from "1" to "0", so that the mobile station generates a specific tone when moving from the home zone to the non-home zone.

Through this process, during the call, the mobile station can generate a specific tone whenever the mobile station moves from the home zone to the non-home zone (or from the non-home zone to the home zone). The subscriber can recognize that the mobile station has moved from the home zone to the non-home zone (or from the non-home zone to the home zone) by hearing the tone generated by the mobile station.

As described above, the present invention has the following advantages. It is possible to apply different charge rates to the mobile station in the home zone and the non-home zone, by monitoring the location information of the mobile station in the home-zone list. That is, by applying different charge rates according to the location of the mobile station, it is possible to provide a low-priced charge plan in which the charge rate is lower than that current mobile telecommunication network billing scheme or equal to or slightly higher than that of the PSTN. In addition, the mobile station indicates its present location by a specific message or a specific tone, so that a subscriber can know both the present location and the type of the charge rate being applied.

While the invention has been shown and described with reference to a certain preferred embodiment thereof, it will be understood by those skilled in the art that various changes in form and detail may be made therein without departing from the spirit and the scope of the invention as defined by the appended claims.

What is claimed is:

1. A method for indicating the location of a mobile station in a cellular mobile telecommunication system, comprising the steps of:

(a) sending, by a mobile station, a location registration request to a visitor location register (VLR) of a mobile switching center (MSC) through a base station serving an area where the mobile station is located and through a base station controller (BSC);

(b) sending the location registration request of the mobile station from the visitor location register (VLR) to a home location register (HLR);

(c) receiving a subscriber information included in the home-zone list of the home location register (HLR) in the visitor location register (VLR), wherein the home-zone list includes a location information of a home zone of the mobile station;

(d) storing the subscriber information of the mobile station from the home location register (HLR) in the visitor location register (VLR) and informing the mobile station of the receipt of the location registration request;

(e) determining whether the mobile station moves between the home zone and a non-home zone based on a determination from the home-zone list in the visitor location register (VLR);

(f) requesting, by the visitor location register (VLR), the mobile station to indicate a present location of the mobile station if the mobile station has moved between the home zone and the non-home zone; and, (g) indicating the present location at the request of the visitor location register (VLR) by the mobile station, and requesting the mobile station to display the present location with a string of characters stating "HOME ZONE" or "NON-HOME ZONE", wherein the present location information for the home zone comprises:

an identification (ID) of a base station servicing the home zone;

an identification (ID) of a base station controller (BSC) controlling the base station;

an identification (ID) of the mobile switching center (MSC) controlling the base station controller (BSC); and, an identification (ID) of each sector if a service zone of the base station is divided into a plurality of sectors by a plurality of sector antennas.

2. The method as claimed in claim 1, further comprising the steps of:

sending, by the mobile station, the present location information of the mobile station to the visitor location register (VLR) prior to the step (f) of requesting the present location; and, sending, by the visitor location register (VLR), the present location information of the mobile station to the home location register (HLR) prior to the step (b) of sending the location registration request of the mobile station to the home location register (HLR).

3. The method as claimed in claim 2, wherein the step (e) of determining whether the mobile station has moved between the home zone and the non-home zone comprises the steps of:

determining, by the visitor location register (VLR), whether the present location information of the mobile station is included in the home-zone list;

setting a home-zone flag to "1" (True) if the present location information of the mobile station is included in the home-zone list, wherein the home-zone flag indicates whether the present location of the mobile station belongs to the home zone or non-home zone;

setting the home-zone flag to "0" (False) if the present location information of the mobile station is not included in the home-zone list;

determining whether the home-zone flag of the mobile station is changed;

deciding that the mobile station has moved between the home zone and the non-home zone if the home-zone flag of the mobile station is changed; and, deciding that the mobile station has not moved between the home zone and the non-home zone if the home-zone flag of the mobile station is not changed.

4. The method as claimed in claim 3, wherein the present location information of the mobile station includes an identification of the mobile switching center, the base station controller (BSC), and the base station.

5. The method as claimed in claim 1, wherein the step (f) of requesting the present location of the mobile station comprises the steps of:

requesting, by the visitor location register (VLR), the mobile station to display a string of characters, "NON-HOME ZONE," if the mobile station moves from the home zone to the non-home zone; and, requesting, by the visitor location register (VLR), the mobile station to display a string of characters, "HOME ZONE," if the mobile station moves from the non-home zone to the home zone.

6. The method as claimed in claim 1, wherein the location indication requesting step comprises the steps of:

requesting, by the visitor location register (VLR), the mobile station to display a string of characters, "HOME ZONE", if the mobile station moves between the non-home zone and the home zone; and displaying the character, "HOME ZONE", in the mobile station at the request of the visitor location register (VLR).

7. A method for indicating the location of a mobile station in a cellular mobile telecommunication system, comprising the steps of:

(a) sending, by a mobile station, a call origination request to a mobile switching center (MSC) through a base station serving a home zone where the mobile station is located and through a base station controller (BSC);

(b) upon receiving the call origination request, sending, by the mobile switching center, a home-zone list including a location information of the home zone to the base station controller (BSC), (c) searching, by the base station controller (BSC), the home-zone list to determine whether the mobile station is located in the home zone or a non-home zone and requesting the mobile station to display its present location;

(d) displaying, by the mobile station, the present location at the request of the base station controller (BSC);

(e) requesting, by the visitor location register (VLR), a home location register (HLR) to provide a home-zone list of the mobile station after sending the home-zone list; and, (f) storing the home-zone list of the mobile station received from the home location register (HLR) in the visitor location register (VLR).

8. The method as claimed in claim 7, further comprising the steps of:

requesting, by the visitor location register (VLR), a home location register (HLR) to provide a home-zone list of the mobile station after sending the home-zone list; and, storing the home-zone list of the mobile station received from the home location register (HLR) in the visitor location register (VLR).

9. The method as claimed in claim 8, wherein the step of requesting the mobile station to display the present location in step (e) comprises the steps of:

requesting, by the base station controller (BSC), the mobile station to display a string of characters, "HOME ZONE", if the present location information of the mobile station is included in the home-zone list; and, requesting, by the base station controller (BSC), the mobile station to display a string characters, "NON-HOME ZONE", if the present location information of the mobile station is not included in the home-zone list.

10. The method as claimed in claim 9, wherein the present location information of the mobile station includes an ID of the mobile switching center, an ID of the base station controller (BSC), and an ID of the base station.

11. The method as claimed in claim 7, wherein the present location information for the home zone comprises:

an identification (ID) of a base station servicing the home zone;

an identification (ID) of a base station controller (BSC) controlling the base station; and, an identification (ID) of the mobile switching center (MSC) controlling the base station controller (BSC).

12. The method as claimed in claim 11, wherein the present location information for the home zone further comprises an identification (ID) of each sector if a service zone of the base station is divided into a plurality of sectors by a plurality of sector antennas.

13. A method for indicating the location of a mobile station in a cellular mobile telecommunication system, comprising the steps of:

(a) receiving, by a mobile switching center, a request for call termination to a mobile station;

(b) upon receiving the call termination request, paging, by the mobile switching center, the mobile station through a base station and a base station controller (BSC);

(c) receiving, by the mobile switching center, a paging response from the mobile station through the base station controller (BSC) and the base station;

(d) upon receiving the paging response, sending, by the mobile switching center, a home-zone list of the mobile station to the base station controller (BSC), wherein the home-zone list includes a location information for a home zone of the mobile station;

(e) searching, by the base station controller (BSC), the home-zone list to determine whether the mobile station is located in the home zone or a non-home zone and requesting the mobile station to indicate a present location of the mobile station;

(f) indicating, by the mobile station, the present location at the request of the base station controller (BSC);

(g) requesting, by the mobile switching center, a visitor location register (VLR) to provide a home-zone list of the mobile station after receiving the call termination request; and, (h) sending, by the visitor location register (VLR), the home-zone list of the mobile station to the mobile switching center.

14. The method as claimed in claim 13, further comprising the steps of:

requesting, by the visitor location register (VLR), a home location register (HLR) to provide a home-zone list of the mobile station after sending the home-zone list; and, storing the home-zone list of the mobile station received from the home location register (HLR) in the visitor location register (VLR).

15. The method as claimed in claim 14, wherein the step (e) of requesting the mobile station to display the present location of the mobile station comprises the steps of:
   requesting, by the base station controller (BSC), the mobile station to display a string of characters, "HOME ZONE", if the present location of the mobile station is included in the home-zone list; and,
   requesting, by the base station controller (BSC), the mobile station to display a string of characters, "NON-HOME ZONE", if the present location information of the mobile station is not included in the home-zone list.

16. The method as claimed in claim 15, wherein the present location information of the mobile station includes an ID of the mobile switching center, an ID of the base station controller (BSC), and an ID of the base station.

17. The method as claimed in claim 13, wherein the present location information for the home zone comprises:
   an identification (ID) of a base station servicing the home zone;
   an identification (ID) of a base station controller (BSC) controlling the base station; and,
   an identification (ID) of the mobile switching center (MSC) controlling the base station controller (BSC).

18. The method as claimed in claim 17, wherein the present location information for the home zone further comprises an identification (ID) of each sector if a service zone of the base station is divided into a plurality of sectors by a plurality of sector antennas.

19. A method for indicating the location of the mobile station in a cellular mobile telecommunication system, comprising the steps of:
   transmitting a call origination request from a first mobile station of a first mobile switching center (MSC) to a second mobile station of a second mobile switching center (MSC);
   requesting a visitor location register (VLR) of the second mobile switching center (MSC) to provide a subscriber information including a home-zone list of the second mobile station, wherein the home-zone list includes a location information for a home zone of the second mobile station;
   sending the subscriber information including the home-zone list of the second mobile station to a visitor location register (VLR) of the second mobile switching center (MSC);
   requesting, by the first mobile switching center, the base station controller (BSC) servicing a zone where the second mobile station is located by paging the second mobile station through the second mobile switching center;
   paging, by the base station controller (BSC), the second mobile station through a base station servicing an area where the second mobile station is located;
   sending, by the second mobile station, a paging response to the first mobile switching center (MSC) through the base station, the base station controller (BSC), and the second mobile switching center;
   ordering, by the first mobile switching center, the second mobile switching center (MSC) to process a call termination;
   sending, by the second mobile switching center, a home-zone list of the second mobile station to the base station controller (BSC);
   determining, by the base station controller (BSC), whether the present location information of the second mobile station is included in the home-zone list;
   requesting, by the base station controller (BSC), the second mobile station to display a string of characters, "HOME ZONE", if the present location information of the second mobile station is included in the home-zone list;
   requesting, by the base station controller (BSC), the second mobile station to display a string of characters, "NON-HOME ZONE", if the present location information of the second mobile station is not included in the home-zone list; and,
   displaying, by the second mobile station, the characters "HOME ZONE" or "NON-HOME ZONE" on a display unit at the request of the base station controller (BSC).

20. A method for applying different charge rates and indicating the location of a mobile station in a cellular mobile telecommunication system, comprising the steps of:
   generating, in a home location register (HLR), a home-zone list including a location information including a unique identification code of each base station servicing a home zone of a mobile station;
   sending, by the mobile station, a location registration request to a visitor location register (VLR) of a mobile switching center (MSC) through the base station and a base station controller (BSC);
   requesting, by the visitor location register (VLR), the home location register (HLR) to provide the home-zone list of the mobile station;
   storing, by the visitor location register (VLR), the home-zone list received from the home location register (HLR) and informing the mobile station of the acceptance of the location registration;
   determining, in the visitor location register (VLR), whether the mobile station has moved between the home zone and the non-home zone based on a determination from the home-zone list;
   requesting, by the visitor location register (VLR), the mobile station to display a zone of the present location if the mobile station has moved between the home zone and the non-home zone;
   displaying, in the mobile station, a zone of the present location at the request of the visitor location controller;
   sending, by the mobile station, a request for call origination to the mobile switching center (MSC) through the base station and the base station controller (BSC);
   sending, by the mobile switching center, a home-zone list request to the visitor location register (VLR);
   sending, by the mobile switching center, the home-zone list received from the visitor location register (VLR) to the base station controller (BSC);
   storing the home-zone list in the base station controller (BSC);
   searching, by the base station controller (BSC), the home-zone list to determine whether the mobile station is located in the home zone or the non-home zone, and requesting the mobile station to display a zone of the present location;
   displaying, by the mobile station, a zone of the present location at the request of the base station controller (BSC);
   establishing, by the mobile station, a call with the mobile switching center (MSC) through the base station and the base station controller (BSC);

periodically sending, by the mobile station in service, the present location information to the base station controller (BSC);

determining, by the mobile station, whether the mobile station has moved from the home zone to the non-home zone based on a determination from the location information and the home-zone list;

requesting, by the base station controller (BSC), the mobile station to generate a specific tone if the mobile station has moved from the home zone to the non-home zone;

generating, by the mobile station, the specific tone at the request of the base station controller (BSC);

calculating, by the mobile station, a call time performed in the home zone and a call time performed in the non-home zone based on a determination from the location information and the home-zone list and sending the calculated call time to the mobile switching center; and, applying, by the mobile switching center, a first charge rate for the call time performed in the home zone and a second charge rate for the call time performed in the non-home zone.

* * * * *